(12) United States Patent
Cordova

(10) Patent No.: US 6,767,938 B1
(45) Date of Patent: Jul. 27, 2004

(54) MODELING DOUGH AND A SURFACE ACTIVE DRYING AGENT COATING COMPOSITION FOR SAME

(75) Inventor: Abimael Cordova, Whittier, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/368,150

(22) Filed: Feb. 18, 2003

(51) Int. Cl.⁷ .............................. C08L 5/04; C08L 5/00
(52) U.S. Cl. .............................. 524/28; 524/56; 524/57; 524/58
(58) Field of Search .............................. 524/28, 56–58, 524/503, 557, 563

(56) References Cited

U.S. PATENT DOCUMENTS

| | | | |
|---|---|---|---|
| 4,172,054 A | 10/1979 | Ogawa et al. | 524/18 |
| H348 H * | 10/1987 | Panayappan | 106/14.14 |
| 5,177,113 A * | 1/1993 | Biss et al. | 514/772.5 |
| 5,498,645 A | 3/1996 | Mariano et al. | 523/218 |
| 5,916,949 A | 6/1999 | Shapero et al. | 524/487 |
| 6,359,057 B1 | 3/2002 | Li | 524/537 |

* cited by examiner

Primary Examiner—Peter Szekely
(74) Attorney, Agent, or Firm—Robert W. Mulcahy

(57) ABSTRACT

This invention relates to modeling doughs comprising algin, a sugar based polysaccharide resin, water and a synthetic resin latex. Additionally disclosed are surface active coating compositions for molded compositions of the algin/sugar-based polysaccharide based modeling dough. Hardening and enhanced drying of the modeling compound articles is accomplished by a spray coating application to a finished molded article by a surface active agent coating composition comprising a Boron containing salt and polyvinylpyrrolidone.

19 Claims, No Drawings

MODELING DOUGH AND A SURFACE ACTIVE DRYING AGENT COATING COMPOSITION FOR SAME

FIELD OF THE INVENTION

The invention relates to a relatively quick drying, pliable, and stable modeling dough having a primary binder comprised of an algin, a sugar based polysaccharide, a synthetic resin latex, and filler. Alternatively, a novel surface active drying coating agent may be applied to the subject modeling dough to provide a hardened molded dough resistant to shrinking, flaking, cracking, and crumbling. More specifically, the algin, sugar-based polysaccharide, and synthetic resin latex provide a primary binder for a dough which forms a hard, durable, non-degrading product.

BACKGROUND OF THE INVENTION

Traditional moldable aqueous compositions and modeling doughs have incorporated starch as a filler material. Such starch based doughs, however, have a tendency to flake, crack, and crumble in both the wet and dry stages. These traditional doughs also typically demonstrate substantial drying shrinkage and discoloration upon drying, as well as leaving a residue on the user's hands. Put another way, such starch based doughs are characterized by poor plasticity, weak dry strength, and substantial dry shrinkage.

As mentioned above, a central problem with typical water-based doughs is that they experience a loss of volume (shrinkage) upon drying. Because water accounts for a large portion of the volume of the dough in its wet stage, water loss upon drying results in a loss of volume in the resulting molded product. One attempt to overcome the shrinkage problem has been to incorporate large proportions of additional filler such in the dough mixture, but shrinkage still occurs because the volume of the dough decreases as the filler binds together after drying. It has been found that a sculpture made with such a dough can lose about 20% of its total volume upon drying. Moreover, the use of large proportions of filler aggravates the flaking, cracking and crumbling problem discussed above, and also tends to decrease the dry strength of the molded sculpture.

Discoloration upon drying is another problem accompanying typical water-based doughs and is compounded by the dry shrinkage discussed above. As the volume decreases, the relative concentration of pigment increases and the color darkens. In some cases, other components (e.g. a salt) preferentially precipitate and form a crusty, hazy surface on the dried artifact. Still other drawbacks of conventional water-based doughs include the fact that many of them would leave a residue on the user's hands, and that they can stain or damage textiles, carpets, furniture, etc., with which they come into contact.

Some of the above drawbacks of conventional modeling doughs have been addressed by the development of water-based modeling doughs comprised of a gelled (crosslinked) polymeric resin, water, and a filler material other than starch. More particularly, these later doughs often used poly(vinyl alcohol) (PVA) as the resin, and added a gellant to cause the crosslinking of the poly(vinyl alcohol). The addition of the gellant, and the subsequent crosslinking of the resin, resulted in a cohesive, water-soluble resin system. When the water evaporated, the dried, gelled, polymer resin material system was durable and lightweight. U.S. Patents which relate to gelling the PVA are: U.S. Pat. No. 5,171,766 to Mariano et al., U.S. Pat. No. 5,364,892 to Miller et al., U.S. Pat. No. 5,498,645 to Mariano et al., U.S. Pat. No. 5,506,280 to Miller et al., and U.S. Pat. No. 5,916,949 to Shapero et al., the disclosures of all of which are incorporated herein by reference.

The above four patents all disclose the use of a gelling agent in conjunction with poly(vinyl alcohol) to form a modeling dough. These references teach that the use of a gelling agent, such as a water soluble borate salt, causes the resin to gel (or crosslink). The result, according to these patents, is a modeling dough which demonstrates wet ductility and low stickiness. However, the doughs incorporating poly(vinyl alcohol) often demonstrated poor stability, short use time, and stiffer textures. Also storage stability and usage time become a problem with the use of poly(vinyl alcohol). The storage problem is due in large part to the fact that as time passes the pH of the system decreases. With lowered pH comes a concomitant reduction in crosslink strength which results in a sticky dough, and a sticky dough does not store well.

In sum, poly(vinyl alcohol)/binder based doughs present challenges in the rapid drying of molded products are encountered and suggest the need for a novel modeling composition which exhibits stability and means for preventing dehydration and decomposition. The present invention is directed to a novel modeling dough composition comprised of an algin binder, a polysaccharide binder, and a synthetic latex comprised of emulsions of polyvinyl alcohol, polyvinyl butyral, polyvinyl acetate, and co-polymers thereof. Additionally the invention is directed to a surface active drying coating compositions for moldable doughs and the technique of applying this coating to the instant modeling doughs to form lightweight, hardened, and durable dough models.

SUMMARY OF INVENTION

It has been found that algin/sugar-based polysaccharide binder based modeling doughs in combination with certain synthetic latex resins will engender stable modeling compositions that have greatly reduced drying times. This enables greater shelf life for these algin/sugar-based polysaccharide binder based modeling doughs as well as increased use time by model makers or children in the case of toy model dough kits. Drying times for these doughs can be further reduced at the point of final use by a coating application to a finished molded article with a novel surface active agent coating composition comprising a molding dough gelling agent and polyvinylpyrrolidone. In this case, the combination of the gelling agent and the polyvinylpyrrolidone at the surface of these modeling dough causes surface linking and interaction of the gellant and polyvinylpyrrolidone with the agglomerate algin/polysaccharide/synthetic resin paricles so as to enhance internal molecular absorbtion of water thereby drying the formed model dough. The blanket coating forms a hard skin on the surface of the dough model resulting in a durable, hard and lightweight model article which prevents any external hydration.

The present invention overcomes the drawbacks inherent in known modeling doughs by a method of making a solid finished model by providing an article of modeling dough comprising a an algin binder, a sugar-based polysaccharide, and synthetic resin latex to form a cohesive resin system. The algin can be any product of marine algae including alginic acid and any salts thereof (e.g. sodium alginate). The algin composition is the water attracting component of the dough and can be alginic acid and any salt or ester thereof. The second major dough component is the larger saccharides known as sugar-based polysaccharides such as polymaltose, polydextrose or corn syrup solids all of which can combine (interlink) with the algin to form aggregate structures. The resin is a synthetic latex solution comprised of emulsions of polyvinyl alcohol, polyvinyl butyral, polyvinyl acetate, and co-polymers thereof. The interaction of the synthetic resin with the algin/sugar-based polysaccharide aggregates forms agglomerates of the three materials which are hydrobinding in nature. The subject matter of the instant invention resides in an improved rapid drying, non-discolorable and non-fading modeling composition for craft articles and toys. An alternative embodiment of the invention is a coating method comprising (i) providing an article of the instant modeling composition and (ii) applying a coating comprised of (a) a gellant for the algin-polysaccharide/binder materials and (b) polyvinylpyrrolidone ("PVP") to the surface of the modeling dough article to form a skin thereon whereby the article is internally dried and rendered hard and durable.

In one preferred form of the instant method, the molding or modeling dough composition so disclosed herein includes from about 0.5% to about 20% total algin, from about 1% to 10% by weight sugar-based polysaccharide resin, from about 5.0 to about 40% water and from about 0.1% to about 3% synthetic latex resin. Optionally, the algin/sugar-based polysaccharide-based composition of the invention may include one or more of a non-algin or non polysaccharide binders such as starch or gums and other additives such as buffering agents, a defoamer, a wetting agent, a humectant, a preservative, a colorant, film formers such as polyvinyl alcohol, and a fragrance. The invention provides a modeling composition which contains readily available components and is non-toxic materials and has sufficient molding properties for modeling craft and toy items. Additionally the instant composition provides a modeling composition which is relatively rapid-drying after modeling so as to generate durable articles. Still further the instant modeling composition is stable after drying and does not exhibit flaking, discoloration, or fadeaway in the modeled article.

The present invention also provides a surface active coating composition for starch-based model articles comprising an aqueous solution of polyvinylpyrrolidone and a generally known gelling or thickening agent for carbohydrate compositions, the most well known being borax salt, such as sodium tetraborate. Preferably the coating composition for the instant algin/polysaccharide based modeling compositons comprises comprising from 1 to 10% sodium tetraborate (Borax), 10 to 30% polyvinylpyrrolidone, 40 to 90% water, and minor amounts of salts, preservatives, and a solvent for the PVP, such as phenoxyethanol,

DETAILED DESCRIPTION OF INVENTION

The subject matter of the present invention resides in an improved rapid-drying, color stable and non-flaking modeling composition for craft and toy articles comprising mainly algin, a sugar based polysaccharide resin, water and a synthetic resin latex. Other filler components such as starch bearing materials, gums, and small amounts of conventional additives such as salt-out or astringent agents, still other fillers, film formers, wetting and lubricating agents, all generally added to create an improved process for producing said novel modeling composition.

The method for making molding composition systems in accordance with the present invention includes combining a polysaccharide-based component and a hydrobinding algin component, the latter component being hydrated sufficiently to provide controlled water delivery to the polysaccharide-based component and/or other ingredients to fully functionalize the final mass into a pliable workable mass capable of being molded. Controlled water delivery means delivery of water in an amount and at a rate which is sufficient to provide internal viscosity and cohesivity to the algin/polysaccharide-based component. The word "hydrated" as used in the term "hydrated hydrobound component" herein means containing sufficient water to provide the requisite controlled water delivery to render the instant modeling composition practically functional as a hand moldable mass; that is, the mass cannot be sticky but yet remains pliable and capable of forming stable shaped articles.

The system created by the combination of ingredients for the present invention is a water-starved or water-diminished system, which means that the system has only enough moisture to bind the ingredients together and provide internal lubricity. Since the ingredients are competing for moisture due to enhanced wettability, there is virtually no free moisture available to separate from the mass. This activity is provided by the hydrated hydrobinding component, the aggomeration of the algin/polysaccharide aggregate with the synthetic resin component. The subject matter of the present invention resides in an improved rapid-drying, dimensionally stable (non-flaking) and non-fading modeling composition for craft and toy modeling articles comprising mainly algin materials, certain polysaccharides and synthetic latex and small amounts of conventional additives such as salt-out or astringent agent, filler, wetting and lubricating agent, and being in the condition of dough and a surface active coating coating compositon and process for coating said novel modeling composition with same.

As noted, the present invention provides a composition for preparing a functionalized molding composition mass without the use of excess water. Functionalization of a moldable mass means providing the ingredients with sufficient internal cohesivity to be molded and handled without losing its integrity as a mass. In order to be handled in the context of functionalization, the mass must also possess internal lubricity which permits inter- and intra-particle movement without loss of cohesiveness. Functionalized molding masses necessarily have the consistency of a dough or very thick paste. However, the present invention is not to be limited by any short-hand description of the consistency of the dough; that is, it is sufficient that the modeling composition be manually pliable and capable of being formed into a stable shaped stable article having minimum hydration loss (dehydration) or gain.

While applicant herein does not wish to be bound by theory, it is believed that water is tightly bound to surface polar sites through chemisorption. These sites may include the hydroxyl groups of hydrophilic materials such as aligns, starches, polysaccharides and sugars, and the synthetic resins used herein. Regardless of the actual mechanism, however, this phenomenon is referred to herein as hydrobinding and applies to the main ingredient combination of algin compounds, polysaccharides, and synthetic resins used in the instant moldeling composition. A hydrated hydrobinding component is an ingredient which imbibes, delivers and maintains water in an amount sufficient to functionalize the resulting mass. The water which is hydrobound does not separate and become a separate phase. Again, a hydrobinding component cooperates with other ingredients to deliver and maintain water sufficient to functionalize the mass of ingredients.

Accordingly, one hydrobinding component can be hydrated and then mixed with the other ingredients (mixiing up the algin/sugar-based polysaccharide based component, and the synthetic resin component) to form a functionalized hydrobound mass agglomerated binder system for the modeling composition. After combining the hydrated hydrobinding component and the additional ingredients, moisture is readily imbibed and disseminated throughout the non-hydrated components and/or ingredients. Unlike prior art methods and dough compositions, additional moisture is not required to form a hydrated mixture and, therefore, excess water is not present in the resulting mass.

The hydrobinding algin component, sugar-based polysaccharide-based component, and synthetic resin component acting in concert with one another, capture or bind sufficient moisture to functionalize the total mass. The ingredients capture the moisture by some mechanism as yet unelucidated, possibly physically, chemically, and/or even biologically. Whatever the binding mechanism may be, water is held and made available for absorption by the remainder of the ingredients. The addition of considerable excess water is thus avoided rendering the molding composition tactile, but not sticky, and firmly pliable to form firm shaped articles.

Of the various ingredients used herein, algin itself in the form of alginic acid and sodium alginate are the preferred compounds. The term "algin" as used herein means any product of marine algae including alginic acid and any salts or esters thereof (e.g. sodium alginate or methyl alginate). An aqueous solution of the algin is mixed with a polysaccharide such as polydextrose and these two materials interact and aggregate with one another absorbing some of the available water. The algin/polydextrose binder and synthetic latex are then mixed and the algin in the aggregate absorbs the water in the synthetic latex so as to swell, and the swelled agglomerate of algin and polysaccharide combines with the synthetic latex to give a definite viscosity, elasticity and plasticity to the composition. Other ingredients such as guns can be added to modify the algin/polydextrose/synthetic resin binder. The gum intervenes between the synthetic resin and the swollen algin/polysaccharide aggregate and plays a part in giving viscosity and elasticity to the product. The amount of algin material to be used in making the composition is preferably from 0.5 to 20% by weight of the total molding composition. If starch is used as an optional additive then it is complementary to the amount of algin ingredient; that is if a starch is used at 5% then the combination of starch and algin ingredient cannot exceed 20% of the total weight of the molding composition.

Since toy and craft use are anticipated for the instant modeling compositions, synthetic latex compositions which are used must be non-toxic, must not have an offensive nor an irritating smell, and must not cause chapped skin, because the composition will come in direct contact with human hands. Further, it is desirable that the composition be white in color, long-lasting and inexpensive. By reason of this, emulsion solutions of polyvinyl acetate, polyvinyl alcohol, or polyvinyl butyral as well as emulsion mixtures, copolymers and terpolymers of these monomeric compounds are desirable synthetic latices which can be used in the present invention. These emulsion solutions are non-toxic to the human body and give suitable workability of modeling composition without sticking to the hand when they are mixed with other components of the composition of this invention.

The synthetic latex of this invention operates so as to cause the formed article to dry rapidly in air to provide a hardened product. The water included in the latex will swell the algin/polysaccharide of the aggregate binder in the molding material and acts as a desirable distributor of various additives of the modeling composition. The concentration of the synthetic latex may be preferably from about 30% to 60% solids content. If lower-concentrate latex is used, the prepared dough loses elasticity, while when the more concentrated latex was used, the dough showed a tendency to crumble to pieces. A preferred latex used in the instant invention are emulsions of polyvinyl acetate, polyvinyl alcohol, or polyvinyl butyral and copolymers (including terpolymers) and mixtures thereof. An especially preferred latex is an emulsion of terpolymer of polyvinyl acetate, polyvinyl alcohol, and polyvinyl butyral in a soap solution and sold under the trademark Butvar Aqueous Dispersion BR manufactured and sold by Solutia, Inc.

As indicated, the invention employs a sugar-based polysaccharide-based material as another major component (the hydrobinding algin component material being the first major component). The sugar-based polysaccharide-based component can include any of a large variety of saccharides such as corn syrup solids and polydextrose, as well as mixtures of two or more of these materials. Corn syrup solids are highly preferred for use as the polysaccharide-based material in the composition of the invention. Corn syrup solids are commonly known as maltodextrins. Maltodextrins are composed of water soluble glucose polymers obtained from the reaction of the starch with acid or enzymes in the presence of water. The hydrolysis reaction produces a carbohydrate mixture of saccharides having a controllable dextrose equivalence (D.E.), commonly a D.E. of less than 20. When the hydrolysis is permitted to proceed to an extent sufficient to produce a D.E. of greater than 20, the FDA calls the resulting materials corn syrup solids. Polydextrose is a non-sucrose, essentially non-nutritive, carbohydrate substitute. It can be prepared from polymerization of glucose in the presence of polycarboxylic acid catalysts and polyols. Generally, polydextrose is known to be commercially available in three forms: Polydextrose A and Polydextrose K, which are powdered solids, and Polydextrose N supplied as a 70% solution. Each of these products can also contain some low molecular weight components, such as glucose, sorbitol, and oligomers. Other saccharide materials function in the instant invention can include tri-, tetra- and oligosaccharides all of which are properly classified as polysaccharides for the purpose of the instant invention.

Other ingredients for use in the instant modeling dough include a "salt-out" agent or astringent agent, which include inorganic compounds such as aluminum sulfate, potassium sulfate, sodium sulfate, sodium chloride and alum. The salt-out agent or astringent agent acts to increase the gellation temperature of the algin and sugar-based polysaccharide, thereby to prevent swelling and rupture of the aggregate binder component of the dough so that a tendency of the composition to become too sticky is suitably avoided, and also acts on any protein from any other additives thereby to change any stickiness to plasticity. The amount of this agent is desirably less than 1% by weight. In the case of a lesser amount of this agent, the above-mentioned effects cannot be attained, while in the case of too great an amount, handling the finished product results in chapped hands and further some crystals are separated on the surface of the modeled product.

One or more of the following can be used as wetting and lubricating agents for the instant modeling composition: propylene glycol, glycerine, paraffin, sorbitol, vegetable oil, mineral oil, lecithin, glycerol ester of aliphatic acid, sucrose ester of aliphatic acid, propylene glycol ester, soybean oil etc. This agent acts to prevent the dough from becoming sticky and to give softness and smoothness to the dough. Other functions of this ingredient are to facilitate separation of the molded article from the mold, and to reduce the freezing point of the water in the dough, thereby to prevent modification of the resin in the dough due to any refrigeration. Further this ingredient acts to regulate the drying speed of the dough in relation to the synthetic latex and thereby prevents cracks from forming in the product due to premature solidification. While not critical, the amount of the wetting and lubricating agent is preferably less than 3% by weight of the modeling dough preparatory composition. In the case of a greater amount, the dough would lose elasticity and preservability is reduced and the dough would become soft and clammy. On the other hand, in the case of a lesser amount, the dough clings to the hands of the worker and is difficult to remove, and moreover suppleness of the composition will be lost, thereby reducing workability.

To recapitulate, the present invention provides (i) novel moldable compositions comprising an algin, a polysaccharide, synthetic resin latex binder, and water and (ii) a surface active drying agent for these moldable or modeling compositions. As to the modeling composition, the combination of algin, sugar-based polysaccharide, and synthetic resin components provides a moldable composition such as a modeling dough having good pliability, storage stability, wet ductility, extrudability, joinability, and color stability. Another favorable characteristic of the dough according to the present invention is that it demonstrates good usage time, without quickly drying upon exposure to air. Again, the algin used herein means any product of marine algae including alginic acid and any salts or esters thereof (e.g. sodium alginate or methyl-, ethyl- or propyl-alginate).

A typical dough according to the present invention comprises algin, present in an amount ranging from 0.5–20% by weight, a polysaccharide present in amounts of from 1 to 10% by weight, a synthetic latex in an amount of from 0.10 to 3%, and water, present in an amount ranging from 5–40%, all percentage by weight of the preparatory modeling dough composition. More preferred ranges are 4 to 9% algin, 1.5 to 5% polysaccharide, 1.0–2% synthetic latex, and from 20 to 30% water.

Poly(vinyl alcohol), may be used as a film former additive in the present application and is a cream-colored powder which is soluble in water and insoluble in most organic solvents. It is made by the hydrolysis of poly(vinyl acetate) and, when commercially purchased, may be partially or fully hydrolyzed. Partially hydrolyzed (88 percent), medium weight (85,000–146,000) polyvinyl alcohols have proved useful as additives to modeling doughs. Among the useful PVA polymeric resins useful as film formers in the present invention are those sold under the tradenames AIRVOL 523, AIRVOL 205 and AIRVOL WS42 by Air Products & Chemicals, Inc. and ELVANOL 52-22 by E.I. du Pont de Nemours and Company and CELVOL 23S and CELVOL 205 by ISP Technologies, Inc.

As demonstrated above, filler materials may be use in the instant composition and include starch and plastic microspheres. The microspheres may be either hollow or solid and should be between 2 and 100.mu. in diameter. Other filler materials include calcium carbonate, cellulose fibers, talc, mica, clays, silicates, and mixtures thereof. In addition, a number of other suitable materials have been found suitable for use in conjunction with the instant algin, polysaccharide, synthetic latex, and water modeling composition. For example, starches, such as wheat, corn, and potato starch may be used. In addition, other plant sources, such as guar, agars, and gum arabic may be used. Examples of such materials include SUPERCOL guar gum, available from Aqualon Co., Wilmington, Del., and AMAIZO 710 corn starch, available from American Maize Products Co., Hammond, Ind.

Examples of polysaccharide gums suitable for use as further additives in the modeling doughs of the present invention include Gellan gum, KELSET, KELTOSE, KELZAN, and KELCOGEL, available from Kelco division of Merck, Inc., San Diego, Calif. Suitable cellulose gums include, for example, carboxymethylcellulose gums, such as AQUALON cellulose gum, available from AQUALON Co., Wilmington, Del., and hydroxyethylcellulose gums, such as that sold under the trademark CELLOCIZE QP40, available from Union Carbide Chemicals & Plastics Co., Inc., Danbury, Conn. These resins may be used in conjunction with poly(vinyl alcohol) in the modeling doughs of the present invention, or may alternatively replace poly(vinyl alcohol).

In addition, a number of other suitable materials have been found suitable for use as fillers in the modeling doughs of the present invention. For example, starches, such as wheat, corn, and potato starch may be used. In addition, other plant sources, such as guar, agars, and gum arabic may be used. Examples of such materials include SUPERCOL guar gum, available from Aqualon Co., Wilmington, Del., and AMAIZO 710 corn starch, available from American Maize Products Co., Hammond, Ind.

A humectant cam also used in the modeling composition of the present invention to inhibit drying and thereby increase usage time. Several preferred humectants also function as a plasticizer. The plasticizer increases flexibility of the dough and makes it generally more workable. Materials which function well as both the humectant and plasticizer include glycerin, propylene glycol, triglycerol, poly (ethylene glycol), diethylene glycol, and combinations thereof. These materials decrease the brittleness of any final dough composition while increasing the usage time.

Water is generally used as the solvent in the present modeling dough compositions. Although tap water is an always available solvent, it will be advantageous under most circumstances to use deionized water. This is so, generally, because the presence of cations, particularly monovalent cations, can lead to some crosslinking of the polymer resin as well as presenting other contamination issues. It should be noted that complete removal of all cations, even where deionized water is used, is unlikely, and thus some negligible crosslinking of the polymer resin could occur under certain circumstances. For example, in the case where microspheres are used as a filler, they are coated with calcium carbonate and it is possible that some divalent cations will be dispersed into the system from the calcium carbonate. This may lead to some degree of crosslinking. As long as the crosslinking is kept to a minimum (preferably to a negligible amount, and most preferably, none), the composition of the present invention will work as described.

The present moldable compositions while outlined above, can also be utilized with many additional components. These additional components include pH adjusters, releasing agents, buffers, defoamers, dispersing agents, scents, preservatives, colors, other visual modifiers, and tactile modifiers. A typical pH adjuster is triethanolamine. A pH adjuster can be added when the pH of the system gets too low. Generally, molecular interactions are weaker when the pH gets too low. This can be compounded when increased loads of boric acid are introduced even at the surface as is the case with the present surface active agent. The solution is to add a pH adjuster to raise the pH level of the system.

Releasing agents can also be added to the modeling composition to reduce tackiness. Typical releasing agents include mineral oil, petroleum, and silicon wax, all of which are safe to the handler and provide improved feel. In addition to releasing agents, buffers and defoamers can be added. These types of additives are known to those skilled in the art, and would include phosphoric acid and Foamex.RTM. 825, respectively (FOAMEX is a registered trademark of Rhodia Inc., of Cranbury, N.J.).

A preservative can be added to increase shelf life, and a wide variety of preservatives are available. Some examples are Kathon.RTM. LX (KATHON is a registered trademark of Rohm & Haas Company of Philadelphia, Pa.), and Nuosept.RTM. 95 (NUOSEPT is a registered trademark of Heyden Newport Chemical Corporation of New York, N.Y.). A preferred weight of preservative in the instant modeling composition is from about 0.15% to about 15% by weight.

As indicated earlier, one embodiment of the invention is directed to a surface active coating composition for the algin-polysaccharide-synthetic latex resin based modeling composition of the instant invention. The key ingredients in any surface active drying solution of the instant invention are polyvinylpyrrolidone and what are otherwise gellants or thickening agents for typical carbohydrate modeling compositions. Most water soluble borate salts are acceptable as gallants in the surface active coating compositions of the invention. Sodium tetraborate is the preferred gellant, however, because it also acts as a buffer to maintain the pH of the surface system with it is interacting as coating material at a level high enough to permit inter-reaction with the primary polymeric resins of the modeling compositions. Other modeling composition thickening agents can be any appropriate inorganic compound, such as $H_3BO_3$, $Ti[OCH(CH_3)_2]_4$, or $TiO(SO_4)$. These compounds form the necessary surface intermolecular interactions with the PVA, the algin and/or any polysaccharide. Boric acid is the preferred thickening agent for the surface active solution and is most preferably present at 0.8% by weight. Other workable gellants include, but are not limited to gellants such as resorcinol, catechol, gallic acid; 2-4-dihydroxy benzoic acid and congo red dye, which include sodium tetraborate (Borax).

The surface active coating composition for the instant modeling dough comprises a solution of (i) a Boron containing compound such as sodium tetraborate, (ii) polyvinylpyrrolidone, (iii) a solvent for polyvinylpyrrolidone such as phenoxyethanol, and (iv) water. Surfactants, humectants, fragrances and preservatives may also be employed in the coating composition. A preferred surface active coating comprises about 1-5% sodium tetraborate, 10–20% polyvinylpyrrolidone ("PVP"), 40–60% water, and residual amounts of surfactants humectants, fragrances and preservatives. The surface active solution is applied to the surface of any finished dough model article to form a thin film or skin to the article which results in a durable and hard molded item.

Suitable polyvinylpyrrolidones include PVP K-15 and K-60, available from GAF Chemicals Corp., Wayne, N.J. Another suitable class of resins are the CARBOPOL resins available from B.F. Goodrich Co., Cleveland, Ohio. A still further class of polyvinylpyrrolidones includes PROVIDERM SK-3 of ISP Technologies, Inc. These resins may also be used in conjunction in the modeling doughs of the present invention as film forming additives.

The following table provides an exemplary formulation of the ranges for the instant algin-polysaccharide-synthetic latex resin based modeling composition, the component amounts being in approximate weight percent. The table also provides the preferred ranges and the most preferred formulation of this exemplary and functional formulation. It is to be understood that where the broadest range is shown, and the low end is zero, that some of each required component must be present, the required components having been set forth above.

TABLE I

| COMPONENT | MOST PREFERED AMOUNT (wt %) | PREFERRED RANGE (wt %) | WORK RANGE (wt %) | DESCRIPTION OF COMPONENT |
|---|---|---|---|---|
| DI water | 25.00 | 20–40 | 10–70 | Solvent |
| Calcium Carbonate | | filler | | |
| Talc | | filler | | |
| Amioca | 1.8 | 1–3 | 0.5–8 | starch filler |
| Crystal Gum | 0.5 | 0.3–1.5 | 0–3 | Tapioca Gum Binder |
| Jaguar 8012 | 1.0 | 0.3–2.0 | 0–3 | Gum Binder |
| Alginate (Kelcogel AFT) | 1.0 | 0.3–2.0 | 0.1–10 | Primary Binder Resin |
| Alginic Acid | 1.0 | 0.3–2.0 | 0.1–10 | Primary Binder Resin |
| Luviscol k-90 (PVP) | 1.0 | 0.3–2.0 | 0.1–3 | Film Former |
| Maltrin | 1.0 | 0.3–2.0 | 0–3 | Polysaccharide Binder |
| Tapioca Dextrin | 1.0 | 0.3–2.0 | 0–3 | Polysaccharide Binder |
| CELVO 23S | 3.92 | 1–4 | 0–6 | PVA-FILM FORM. |
| CELVO 205 | 7.00 | 1–4 | 0–6 | PVA-FILM FORM. |
| Silica | | filler | | |
| Propyl Paraben | | preservative | | |
| Methyl Paraben | | preservative | | |
| Calcium Chloride | | Stabilizer | | |
| Dimethicone | 0.5 | 0.2–1.0 | 0–5 | Release Agent |
| Soybean Oil | 0.5 | 0.2–1.0 | 0–5 | Release Agent |
| Butvar | 0.5 | 0.2–3.0 | 0.1–5 | Resin Latex |

Celvo 23S and Celvo 205 are examples of poly(vinyl alcohol) film forming additives in the instant algin-polysaccharide-synthetic resin modeling dough; that is, the PVA is an optional film forming (non-binder) additive to this embodiment. In addition, not all additives, such as colors and scents, microsphere fillers etc. are set out in the above table. These can be optionally added as discussed above. This formulation when dried has been found to be a moldable composition that is particularly well suited for use by young children. It is tactile, pleasing to touch, easy to use and manipulate, and applicable to a number of uses. It is also relatively easy and inexpensive and economical to manufacture by processes readily available in the existing art.

The subject algin-polysaccharide-synthetic resin modeling dough can be prepared by numerous means well known in the prior art such as those processes outlined in U.S. Pat. No. 5,916,949 incorporated by reference above. A typical process uses a two phase step of formulating the primary algin and polysaccharide compounds with optional additives all added to an Excelsior Mixer in a first phase. After mixing this phase, a second mixed phase containing the synthetic resin latex is added to the first phase and slow mixing occurs in the Mixer at room temperature.

As indicated throughout this application, this composition can be spray coated with the following surface activate solution having the following ingredients:

TABLE II

| | MOST PREFERED AMOUNT | PREFERRED RANGE | WORK RANGE | DESCRIPTION OF COMPONENT |
|---|---|---|---|---|
| Borax | 1.0 | 0.2–3.0 | 0.5–5 | PVA Thickening Agent |
| Propylene Glycol | 1.0 | 0.2–3.0 | 0.5–5 | Humectant |
| Providerm SK-3 | 5.0 | 0.5–10 | 0.5–15 | Polyvinyl-pyrrolidone |
| Glycerin | 1.0 | 0.2–3.0 | 0.5–5 | Preservative |
| Methyl Paraben | 1.0 | 0.2–3.0 | 0.5–5 | Preservative |
| Sodium Chloride | 1.0 | 0.2–3.0 | 0.5–5 | Preservative |
| Phenoxyethanol | 1.0 | 0.2–3.0 | 0.5–5 | Solvent for PVP |

When the solution of Table II is applied as a spray coating to the modeling dough composition of Table I there results a hardened molded article with a hard durable skin coat. It is to be understood that any means of applying the instant surface active coating composition to the subject algin-polysaccharide-synthetic resin modeling dough may be employed to attain a hardened molded article.

Although the present invention has been particularly described in conjunction with specific preferred embodiments, it is evident that many alternatives, modifications, and variations will be apparent to those skilled in the art. It is therefore contemplated that the appended claims will embrace any such alternatives, modifications, and variations as falling within the true scope and spirit of the present invention.

What is claimed:

1. A modeling dough composition comprising water, an algin, a sugar-based polysaccharide, and a resin, wherein the resin is a synthetic latex comprised of emulsions of polyvinyl acetate, polyvinyl alcohol, or polyvinyl butyral and copolymers, terpolymers, and mixtures thereof.

2. A modeling dough composition according to claim 1 additionally comprising a filler.

3. A modeling dough composition according to claim 1, wherein the sugar-based polysaccharide is selected from the group consisting of corn syrup solids, polyglucose, polydextrose, oligosaccharides, and mixtures thereof.

4. A modeling dough composition according to claim 3, wherein the corn syrup solid is a maltodextrin.

5. A modeling dough composition according to claim 2, wherein said filler is selected from the group consisting of a starch, a gum, or microspheres.

6. A modeling dough composition according to claim 5, wherein the filler is a natural gum selected from the group consisting of guar, agars, and gum arabic.

7. A modeling dough composition according to claim 1, wherein algin is alginic acid or alginate derivatives thereof.

8. A modeling dough composition according to claim 1 wherin the synthetic latex is an emulsion comprised of a terpolymer of polyvinyl acetate, polyvinyl alcohol, or polyvinyl butyral.

9. A modeling dough composition according to claim 1, comprising from about 5% to about 40% by weight water, from about 0.5% to about 20% by weight algin, from about 1% to about 10% by weight sugar-based polysaccharide, and from about 0.1% to 3% by weight synthetic latex emulsion.

10. A modeling dough composition according to claim 1, comprising from about 20% to about 30% by weight water, from about 4% to about 9% by weight algin, from about 1.5% to about 5% by weight sugar-based polysaccharide, and from about 1.0% to 2% by weight synthetic latex emulsion.

11. A modeling dough composition according to claim 9 additionally comprising a filler.

12. A modeling dough composition according to claim 9, further comprising a humectant.

13. A moldable modeling dough composition according to claim 1, further comprising a scent and a colorant.

14. A modeling dough composition according to claim 2, wherein said filler is selected from the group consisting of plastic microspheres, aramid pulp fibers, cellulose fibers, talc, calcium carbonate, mica, clays, silicates, and mixtures thereof.

15. A process for making a modeled dough article comprising:

a) providing a modeling dough composition comprising water and a primary binder comprised of an algin, a sugar-based polysaccharide, and a resin, wherein the resin is a synthetic latex comprised of emulsions of polyvinyl acetate, polyvinyl alcohol, or polyvinyl butyral and copolymers, terpolymers, and mixtures thereof; and b) applying a surface active coating composition comprised of (i) a gelling agent for the primary binder and (ii) polyvinylpyrolidone.

16. The process of claim 15 wherein the gelling agent is a water soluble borate salt.

17. The process of claim 16 wherein the borate salt is sodium tetraborate.

18. The process of claim 16 wherein the modeling dough composition further comprises a filler.

19. The process of claim 16 wherein the synthetic latex of the modeling dough composition is an emulsion comprised of a terpolymer of polyvinyl acetate, polyvinyl alcohol, or polyvinyl butyral.

* * * * *